US012406086B1

(12) United States Patent
Leach et al.

(10) Patent No.: US 12,406,086 B1
(45) Date of Patent: *Sep. 2, 2025

(54) METHODS AND SYSTEMS FOR TRACKING AND REGULATING THE AVAILABILITY OF SYNDICATED DATA ITEMS ACROSS MULTIPLE COMMUNICATION CHANNELS INCLUDING ONLINE AND OFFLINE CHANNELS

(71) Applicant: Ibotta, Inc., Denver, CO (US)

(72) Inventors: Bryan Leach, Denver, CO (US); Luke Swanson, Denver, CO (US)

(73) Assignee: Ibotta, Inc., Denver, CO (US)

( * ) Notice: Subject to any disclaimer, the term of this patent is extended or adjusted under 35 U.S.C. 154(b) by 227 days.

This patent is subject to a terminal disclaimer.

(21) Appl. No.: 17/966,167

(22) Filed: Oct. 14, 2022

Related U.S. Application Data

(63) Continuation of application No. 16/133,399, filed on Sep. 17, 2018, now Pat. No. 11,507,688, which is a
(Continued)

(51) Int. Cl.
*G06F 21/62* (2013.01)
*H04L 9/40* (2022.01)
(Continued)

(52) U.S. Cl.
CPC ........ *G06F 21/6245* (2013.01); *H04L 63/102* (2013.01); *H04L 67/1095* (2013.01); *H04L 67/535* (2022.05)

(58) Field of Classification Search
None
See application file for complete search history.

(56) References Cited

U.S. PATENT DOCUMENTS 4,674,041 A    6/1987   Lemon et al.
4,996,642 A    2/1991   Hey
(Continued)

FOREIGN PATENT DOCUMENTS

WO    WO-2012177766 A1    12/2012

OTHER PUBLICATIONS

"U.S. Appl. No. 12/950,103, Non-Final Office Action mailed Sep. 6, 2013", 26 pgs.
(Continued)

*Primary Examiner* — Taghi T Arani
*Assistant Examiner* — Joshua Raymond White
(74) *Attorney, Agent, or Firm* — Wilson Sonsini Goodrich & Rosati

(57) ABSTRACT

The present disclosure provides methods and systems for method for regulating access to syndicated data across multiple communication channels, including online and offline channels. A syndicated data item may be activated upon performance or completion of a user activity (e.g., online user activity, offline user activity, etc.). A syndicated data item may have one or more expiration conditions, wherein after expiration, the syndicated data item becomes unavailable for activation. The systems and methods may simultaneously or substantially simultaneously, in real-time or in near real-time, assess the expiration status of a syndicated data item delivered to a user across multiple communication channels, including online and offline channels.

20 Claims, 6 Drawing Sheets

Related U.S. Application Data continuation-in-part of application No. 15/592,062, filed on May 10, 2017, now abandoned.

(60) Provisional application No. 62/334,368, filed on May 10, 2016.

(51) Int. Cl.
*H04L 67/1095* (2022.01)
*H04L 67/50* (2022.01)

(56) References Cited

U.S. PATENT DOCUMENTS

| | | | |
|---|---|---|---|
| 5,201,010 | A | 4/1993 | Deaton et al. |
| 5,642,485 | A | 6/1997 | Deaton et al. |
| 5,649,114 | A | 7/1997 | Deaton et al. |
| 5,659,469 | A | 8/1997 | Deaton et al. |
| 5,675,662 | A | 10/1997 | Deaton et al. |
| 5,687,322 | A | 11/1997 | Deaton et al. |
| 5,774,868 | A | 6/1998 | Cragun et al. |
| 5,832,457 | A | 11/1998 | O'Brien et al. |
| 6,009,411 | A | 12/1999 | Kepecs |
| 6,026,370 | A | 2/2000 | Jermyn |
| 6,049,777 | A | 4/2000 | Sheena et al. |
| 6,076,068 | A | 6/2000 | Delapa et al. |
| 6,230,143 | B1 | 5/2001 | Simons et al. |
| 6,292,786 | B1 | 9/2001 | Deaton et al. |
| 6,484,146 | B2 | 11/2002 | Day et al. |
| 6,543,683 | B2 | 4/2003 | Hoffman |
| 6,641,037 | B2 | 11/2003 | Williams |
| 6,782,370 | B1 | 8/2004 | Stack |
| 6,827,260 | B2 | 12/2004 | Stoutenburg et al. |
| 6,862,575 | B1 | 3/2005 | Anttila et al. |
| 6,886,742 | B2 | 5/2005 | Stoutenburg et al. |
| 7,086,584 | B2 | 8/2006 | Stoutenburg et al. |
| 7,120,591 | B1 | 10/2006 | Solomon et al. |
| 7,305,129 | B2 | 12/2007 | Chellapilla et al. |
| 7,506,809 | B2 | 3/2009 | Stoutenburg et al. |
| 7,552,087 | B2 | 6/2009 | Schultz et al. |
| 7,552,094 | B2 | 6/2009 | Park et al. |
| 7,600,673 | B2 | 10/2009 | Stoutenburg et al. |
| 7,657,436 | B2 | 2/2010 | Elmore et al. |
| 7,698,171 | B2 | 4/2010 | Rampell et al. |
| 7,742,989 | B2 | 6/2010 | Schultz |
| 7,792,709 | B1 | 9/2010 | Trandal et al. |
| 7,831,481 | B2 | 11/2010 | Rodriguez et al. |
| 7,899,710 | B1 | 3/2011 | Walker et al. |
| 7,904,384 | B2 | 3/2011 | Lilly et al. |
| 8,001,046 | B2 | 8/2011 | Schultz |
| 8,046,257 | B2 | 10/2011 | Wane et al. |
| 8,095,439 | B1 | 1/2012 | Harman et al. |
| 8,112,356 | B2 | 2/2012 | Schultz |
| 8,146,810 | B1 | 4/2012 | Segura |
| 8,165,960 | B2 | 4/2012 | Schultz |
| 8,199,742 | B1 | 6/2012 | Croak et al. |
| 8,285,604 | B1 | 10/2012 | Trandal et al. |
| 8,364,522 | B1* | 1/2013 | Gevelber ............ G06Q 30/0224 |
| | | | 705/14.1 |
| 9,015,277 | B1 | 4/2015 | Slavin et al. |
| 9,972,047 | B1 | 5/2018 | Elliott et al. |
| 10,437,840 | B1 | 10/2019 | Poh et al. |
| 11,323,505 | B2 | 5/2022 | Leach |
| 11,507,688 | B1* | 11/2022 | Leach ................. H04L 63/102 |
| 11,818,198 | B2 | 11/2023 | Leach |
| 12,047,434 | B2 | 7/2024 | Leach |
| 2002/0004783 | A1 | 1/2002 | Paltenghe et al. |
| 2002/0103834 | A1 | 8/2002 | Thompson et al. |
| 2002/0152118 | A1 | 10/2002 | Hadjigeorgis |
| 2002/0153414 | A1 | 10/2002 | Stoutenburg et al. |
| 2002/0156683 | A1 | 10/2002 | Stoutenburg et al. |
| 2002/0166891 | A1 | 11/2002 | Stoutenburg et al. |
| 2002/0188509 | A1 | 12/2002 | Ariff et al. |
| 2002/0188527 | A1 | 12/2002 | Dillard et al. |
| 2002/0188559 | A1 | 12/2002 | Schultz |
| 2002/0188561 | A1 | 12/2002 | Schultz |
| 2003/0009368 | A1* | 1/2003 | Kitts ................. G06Q 30/0205 |
| | | | 705/7.34 |
| 2003/0023525 | A1 | 1/2003 | Chen |
| 2003/0032476 | A1 | 2/2003 | Walker et al. |
| 2003/0066091 | A1 | 4/2003 | Lord et al. |
| 2004/0003402 | A1 | 1/2004 | McKenna, Jr. |
| 2004/0049427 | A1 | 3/2004 | Tami et al. |
| 2004/0111360 | A1 | 6/2004 | Albanese |
| 2004/0181749 | A1 | 9/2004 | Chellapilla et al. |
| 2004/0238637 | A1 | 12/2004 | Russell et al. |
| 2005/0091104 | A1 | 4/2005 | Abraham |
| 2005/0240525 | A1 | 10/2005 | Bagayatkar |
| 2006/0036502 | A1 | 2/2006 | Farrell |
| 2006/0277103 | A1 | 12/2006 | Fujita et al. |
| 2007/0094088 | A1 | 4/2007 | Mastie et al. |
| 2007/0290043 | A1 | 12/2007 | Russell et al. |
| 2007/0291747 | A1 | 12/2007 | Stern et al. |
| 2008/0065490 | A1 | 3/2008 | Novick et al. |
| 2008/0073429 | A1 | 3/2008 | Oesterling et al. |
| 2008/0077506 | A1 | 3/2008 | Rampell et al. |
| 2008/0154704 | A1 | 6/2008 | Flake et al. |
| 2008/0195460 | A1 | 8/2008 | Varghese |
| 2008/0196060 | A1 | 8/2008 | Varghese |
| 2009/0013359 | A1 | 1/2009 | Butler et al. |
| 2009/0063274 | A1 | 3/2009 | Dublin, III et al. |
| 2009/0281888 | A1 | 11/2009 | Zai et al. |
| 2009/0299887 | A1 | 12/2009 | Shiran et al. |
| 2010/0106568 | A1 | 4/2010 | Grimes |
| 2010/0106569 | A1 | 4/2010 | Grimes |
| 2010/0106577 | A1 | 4/2010 | Grimes |
| 2010/0106596 | A1 | 4/2010 | Grimes |
| 2010/0121708 | A1 | 5/2010 | Schultz |
| 2010/0121723 | A1 | 5/2010 | Miller et al. |
| 2010/0318407 | A1 | 12/2010 | Leff et al. |
| 2011/0010273 | A1 | 1/2011 | Lee |
| 2011/0014972 | A1 | 1/2011 | Herrmann et al. |
| 2011/0066497 | A1 | 3/2011 | Gopinath et al. |
| 2011/0125561 | A1 | 5/2011 | Marcus |
| 2011/0166934 | A1 | 7/2011 | Comay et al. |
| 2011/0178861 | A1 | 7/2011 | Georgi |
| 2011/0184822 | A1 | 7/2011 | Matkovic |
| 2011/0208586 | A1 | 8/2011 | Joa et al. |
| 2011/0258024 | A1 | 10/2011 | Prince |
| 2011/0282748 | A1 | 11/2011 | Ciurea |
| 2012/0072280 | A1 | 3/2012 | Lin |
| 2012/0143666 | A1* | 6/2012 | Carrion ................. G06Q 30/02 |
| | | | 705/14.23 |
| 2012/0233011 | A1 | 9/2012 | Barlow |
| 2012/0284107 | A1 | 11/2012 | Gernaat et al. |
| 2012/0310831 | A1 | 12/2012 | Harris et al. |
| 2012/0323656 | A1 | 12/2012 | Leach |
| 2012/0323663 | A1 | 12/2012 | Leach |
| 2013/0073381 | A1* | 3/2013 | Binkley ................. G06Q 30/02 |
| | | | 705/14.48 |
| 2015/0170181 | A1 | 6/2015 | Sampson et al. |
| 2015/0213480 | A1* | 7/2015 | Slavin ................. G06Q 30/0222 |
| | | | 705/14.42 |
| 2018/0075224 | A1* | 3/2018 | Yang ....................... G06F 21/10 |
| 2018/0295177 | A1 | 10/2018 | Leach |
| 2024/0259462 | A1 | 8/2024 | Leach |

OTHER PUBLICATIONS

"U.S. Appl. No. 13/527,395, Final Office Action mailed Jun. 13, 2013", 24 pgs.

"U.S. Appl. No. 13/527,395, Non-Final Office Action mailed Nov. 26, 2012", 22 pgs.

"U.S. Appl. No. 13/571,150, Final Office Action mailed May 1, 2013", 13 pgs.

"U.S. Appl. No. 13/571,150, Non Final Office Action mailed Nov. 20, 2012", 14 pgs.

Arar, Yardena, "Online Bargains: How to Use Groupon and Its Competitors", [Online]. Retrieved from the Internet: < url: https:="" www.pcworld.com="" printable="" article="" id,219645="" printable. html="" >, (Feb. 15, 2011), 5 pgs.

Belkin, N. J., et al., "Information Filtering and Information Retrieval: Two Sides of the Same Coin?", Communications of the ACM, 35, (Dec. 1992), 29-38.

(56) References Cited

OTHER PUBLICATIONS

Breuel, Thomas M, "Robust Least Square Baseline Finding using a Branch and Bound Algorithm", tbreuel@parc.xerox.com, (2002), 8 pgs.
Breuel, Thomas M, "Two Geometric Algorithms for Layout Analysis", Xerox Palo Alto Research Center, (2002), 12 pgs.
Co-pending U.S. Appl. No. 15/592,062, inventors Leach; Bryan et al., filed May 10, 2017.
Co-pending U.S. Appl. No. 17/720,177, inventor Leach; Bryan W., filed Apr. 13, 2022.
Ewing, Tom, et al., "The Giants Among US", 2012 Stan. Tech. L. Rev. 1 Copyright © 2011 Stanford Technology Law Review., (2011), 63 pgs.
Fenton, William, "iPhone Adds Google Shopper to its Cart", Copyright (c) 2012 Ziff Davis Inc., [Online]. Retrieved from the Internet: < url: http:="" www.pcmag.com="" article2="" 0,2817,2379221,00. asp="" >, (Feb. 2, 2011), 3 pgs.
Gibbs, Mark, "Shoeboxed: Making Business Life Less Tedious", [Online]. Retrieved from the Internet: < url:https: www.pcworld. com="" printable="" article="" id,174447="" printable.html="" >, (Oct. 27, 2009), 1 pg. < /url:https: > .
Gohring, Nancy, Visa, MasterCard and AmEx Join Google Wallet Competitor, [Online]. Retrieved from the Internet: < url: https:="" www.pcworld.com="" printable="" article="" id,236030="" printable. html="" >, (Jul. 19, 2011), 7 pgs.
"Grocery Gadget® Shopping List Now Available for Blackberry®", HookMedia, [Online]. Retrieved from the Internet: URL: http:// www.prlog.org/11391540-grocery-gadget-shopping-list-now-available-for-blackberry.html;, (Mar. 22, 2011), 2 pgs.
"Grocery iQ Adds Android to Its" List-, BusinessWire, [Online]. Retrieved from the Internet: < url: http:="" www.businesswire. com="" news="" home="" 20100309005814="" en="" >, (Mar. 6, 2010), 3 pgs.
He, J, et al., "A Comparison of Binarization Methods for Historical Archive Documents", Proceedings of the 2005 Eight International Conference on Document Analysis and Recognition (ICDAR'05), (2005), 5 pgs.
Hill, Kashmir, "How Target Figured Out a Teen Girl Was Pregnant Before Her Father Did", [Online]. Retrieved from the Internet: , (Feb. 16, 2012), 5 pgs.
"Shopping Trends Analysis Tool Now Available; Flixoft Enhances Grocery Gadget® Web Portal", © Copyright 1997-2012, Vocus PRW Holdings, LLC., [Online]. Retrieved from the Internet: < url: http:="" www.prweb.com="" printer="" 5052114.htm="" >, (Feb. 10, 2011), 2 pgs.
"International Application Serial No. PCT/US2012/043354, Search Report mailed Sep. 13, 2012", 3 pgs.
"International Application Serial No. PCT/US2012/043354, Written Opinion mailed Sep. 13, 2012", 11 pgs.
Klein, Jennifer, "Perceptual Distortions", Visual Studies Senior Thesis, (2006), 44 pgs.
Knight, Kristina, Survey finds Americans shopping smarter, not harder, BizReport, [Online]. Retrieved from the Internet: < url: http:="" www.bizreport.com="" 2011="" 04="" survey-="" >, (Apr. 5, 2011), 3 pgs.
"Lemon.com Debuts With Receipt Organizer and Spending Management Tools", © 2008 SYS-CON Media Inc., [Online]. Retrieved from the Internet: < url: http:="" www.sys-con.com="" node="" 2020058="" print="" >, (Accessed Jul. 30, 2012), 2 pgs.
Miller, Claire Cain, "Visa Invests in Square for Mobile Payments", Copyright 2012 The New York Times Company, [Online]. Retrieved from the Internet: < url: http:="" bits.blogs.nytimes.com="" 2011="" 04="" 27="" visa-invests-in-square- . . . ="" >, (Apr. 27, 2011), 2 pgs.
Office Action dated Mar. 6, 2014 for U.S. Appl. No. 13/571,150.
Office Action dated Jun. 30, 2017 for U.S. Appl. No. 13/571,150.
Office Action dated Jul. 28, 2017 for U.S. Appl. No. 15/592,062.
U.S. Appl. No. 13/527,395 Office Action dated May 29, 2014.
U.S. Appl. No. 13/571,150 Office Action dated Feb. 26, 2018.
U.S. Appl. No. 15/592,062 Office Action dated Mar. 15, 2018.
U.S. Appl. No. 15/927,861 Notice of Allowance dated Jan. 5, 2022.
U.S. Appl. No. 15/927,861 Office Action dated Jan. 21, 2020.
U.S. Appl. No. 15/927,861 Office Action dated Jul. 20, 2021.
U.S. Appl. No. 15/927,861 Office Action dated Mar. 9, 2021.
U.S. Appl. No. 15/927,861 Office Action dated Sep. 15, 2020.
U.S. Appl. No. 16/133,399 Notice of Allowance dated Jul. 20, 2022.
U.S. Appl. No. 16/133,399 Office Action dated Feb. 24, 2021.
U.S. Appl. No. 16/133,399 Office Action dated Jan. 20, 2022.
U.S. Appl. No. 16/133,399 Office Action dated Jun. 23, 2021.
U.S. Appl. No. 16/133,399 Office Action dated May 8, 2020.
Yin, Sara, "What Google Wallet Looks Like at American Eagle Out", Copyright (c) 2012 Ziff Davis Inc., [Online]. Retrieved from the Internet: < url: http:="" www.pcmag.com="" article2="" 0,2817,2393207,00.asp="" >, (Sep. 19, 2011), 5 pgs.
U.S. Appl. No. 17/958,199 Office Action dated Apr. 6, 2023.
Co-pending U.S. Appl. No. 18/464,973, filed Sep. 11, 2023.
U.S. Appl. No. 17/720,177 Office Action dated Jul. 31, 2023.
U.S. Appl. No. 17/958,199 Corrected Notice of Allowability dated Aug. 11, 2023.
U.S. Appl. No. 17/958,199 Notice of Allowance dated Jul. 18, 2023.
U.S. Appl. No. 17/720,177 Notice of Allowance dated Apr. 15, 2024.
U.S. Appl. No. 18/464,973 Office Action dated Aug. 15, 2024.
U.S. Appl. No. 18/464,973 Office Action dated Dec. 10, 2024.
U.S. Appl. No. 18/464,973 Office Action dated Feb. 18, 2025.

\* cited by examiner

METHODS AND SYSTEMS FOR TRACKING AND REGULATING THE AVAILABILITY OF SYNDICATED DATA ITEMS ACROSS MULTIPLE COMMUNICATION CHANNELS INCLUDING ONLINE AND OFFLINE CHANNELS

CROSS-REFERENCE

This application is a continuation of U.S. patent application Ser. No. 16/133,399, filed Sep. 17, 2018, which is a continuation-in-part of U.S. patent application Ser. No. 15/592,062, filed May 10, 2017, which claims the benefit of U.S. Provisional Application No. 62/334,368, filed May 10, 2016, each of which applications is entirely incorporated herein by reference.

BACKGROUND

With the widespread use of mobile wireless devices and the increased use of the Internet, it has become increasingly difficult to synchronize the different online and offline activities of a user. When there is a real benefit (e.g., educational benefit which awards educational credit, monetary benefit which awards financial credit, reputational benefit which awards reputation, opportunistic benefit which awards opportunities, informational benefit which awards information, etc.) involved in activating a certain data item, and the data item may be activated via multiple channels, some users may be wrongly incentivized to defraud the benefit provider by attempting to activate the data item multiple times to receive the benefit multiple times. This may be especially problematic for data items that can be activated via multiple channels that include both online and offline channels.

SUMMARY

Recognized here is a need for methods and systems to address at least the abovementioned problems. Provided are methods and systems for tracking and regulating the availability of syndicated data items across multiple communication channels, including online and offline channels. A syndicated data item may be delivered to a user across multiple communication channels, including online and offline channels. A syndicated data item may be activated upon performance or completion of a user activity (e.g., online user activity, offline user activity, etc.). In some instances, a syndicated data item may expire (e.g., become unavailable for activation) upon a first instance of the user activity. In some instances, a syndicated data item may expire (e.g., become unavailable for activation) upon a finite number of instances of the user activity. In some instances, a syndicated data item may expire (e.g., become unavailable for activation) upon activation by the first user. In some instances, a syndicated data item may expire (e.g., become unavailable for activation) upon activation by a finite number of users. In yet some other instances, a syndicated data item may expire (e.g., become unavailable for activation) upon a combination of two or more expiration conditions described above. Upon successful activation of a syndicated data item, a user may receive a real benefit associated with the syndicated data item, such as an educational benefit which awards educational credit, monetary benefit which awards financial credit, reputational benefit which awards reputation, opportunistic benefit which awards opportunities, informational benefit which awards information, and the like to the user.

The activate-able and expire-able syndicated data item may be delivered to a user via multiple communication channels, including online and offline channels, and be activated upon completion or performance of a user activity, including both online and offline activities. Beneficially, systems and methods of the present disclosure may track and regulate the availability of activation of a syndicated data item (having an expiration condition) across multiple communication channels, including online and offline channels, to prevent digital channel conflicts and undesirable syndicated data item stacking. For instance, a user may attempt to combine and activate various syndicated data items via a single user activity in a way that was not intended by the issuer of the syndicated data item. Such issues may be more pronounced when there are multiple different forms of delivery methods of the syndicated data items (to the user). Furthermore, when the syndicated data item involve both activation and redemption of the real benefit associated with the syndicated data item, the challenges of tracking—in real-time or near real-time—the activation and redemption of each data item may be exacerbated. Accurately tracking the activation and redemption of syndicated data item across multiple different channels and systems may prove critical.

Provided herein are methods and systems for regulating delivery and activation of syndicated data items, and redemption of real benefits associated with the syndicated data items, across multiple channels simultaneously or substantially simultaneously. The systems and related methods described herein can enable real-time management and regulation of syndicated data items and related activities. As the number of distribution channels increase and the number of syndicated data items rapidly increase, traditional systems are not capable of regulating activations or redemptions of such data items in real-time, across multiple different types of channels, both online and offline. Furthermore, as users may use various different personal identifications (e.g., using different user IDs across different websites) across different platforms or channels, no manual methods or operations are able to match each user, in real-time, to any database to meaningfully and instantly determine the validity of a request for redemption.

In an aspect, a computer-implemented method for regulating availability of a syndicated data item to a user across a plurality of participating computer platforms may be provided. The method may comprise: generating (i) a user identifier associated with a user on a plurality of participating computer platforms and (ii) a syndicated data identifier associated with a syndicated data item on said plurality of participating computer platforms; receiving said syndicated data item whose availability to said user across said plurality of participating computer platforms is limited, wherein said syndicated data item comprises data indicating a configurable number of maximum access requests from said user across said plurality of participating computer platforms; receiving, from said user on a given participating computer platform among said plurality of participating computer platforms, a request to access said syndicated data item, said request comprising said user identifier and said syndicated data identifier, wherein said syndicated data identifier is associated with said syndicated data item; determining, based at least in part on said user identifier and said syndicated data identifier, whether said syndicated data item on said given participating computer platform is accessible by said user, which determining is based at least in part on whether a number of times said syndicated data item has previously been accessed by said user at said given participating computer platform or other participating computer platforms among said plurality of participating computer platforms is less than said configurable number of maximum access requests; and providing a response to said given participating computer platform to indicate whether said requested syndicated data item is accessible by said user.

In some embodiments, the providing operation may further comprise displaying said response of the request on a graphical user interface of said given participating computer platform.

In some embodiments, the providing operation may further comprise displaying the response of the request on a graphical user interface of a mobile electronic device of the user. The graphical user interface may be further configured by a mobile application running on the mobile electronic device.

In some embodiments, the method may further comprise notifying another participating computer platform of the plurality of participating computer platforms as to whether the syndicated data item is accessible by the user at the given participating computer platform or other participating computer platforms among the plurality of participating computer platforms.

In some embodiments, the user identifier may comprise any two of e-mail address, a user ID, and device identification (ID) of the user.

In some embodiments, the syndicated data item further comprises access request time, access request location, and a type of the participating platform among the plurality of participating computer platforms.

In some embodiments, the determining operation may be further based on whether the syndicated data item has been accessed a given number of times by a plurality of users, the given number of times configured to limit a number of times the syndicated data item is accessible across the plurality of participating platforms by the plurality of users.

In another aspect, a system for regulating availability of a syndicated data item to a user across a plurality of participating computer platforms may be provided. The system may comprise: one or more computer servers comprising at least one electronic data repository; and one or more computer processors operatively coupled to the one or more computer servers, wherein the one or more computer processors are individually or collectively programmed to: generate (i) a user identifier associated with a user on a plurality of participating computer platforms and (ii) a syndicated data identifier associated with a syndicated data item on the plurality of participating computer platforms; receive the syndicated data item whose availability to the user across the plurality of participating computer platforms is limited, wherein the syndicated data item comprises data indicating a configurable number of maximum access requests from the user across the plurality of participating computer platforms; receive, from the user on a given participating computer platform among the plurality of participating computer platforms, a request to access the syndicated data item, the request comprising the user identifier and the syndicated data identifier, wherein the syndicated data identifier may be associated with the syndicated data item; determine, based at least in part on the user identifier and the syndicated data identifier, whether the syndicated data item on the given participating computer platform can be accessible by the user, which determining is based at least in part on whether a number of times the syndicated data item has previously been accessed by the user at the given participating computer platform or other participating computer platforms among the plurality of participating computer platforms is less than the configurable number of maximum access requests; and provide a response to the given participating computer platform to indicate whether the requested syndicated data item is accessible by the user.

In some embodiments, the system may further comprise notifying another participating computer platform of the plurality of participating computer platforms as to whether the syndicated data item is accessible by the user at the given participating computer platform or other participating computer platforms among the plurality of participating computer platforms.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and a non-transitory computer readable medium coupled thereto. The non-transitory computer-readable medium may comprise machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
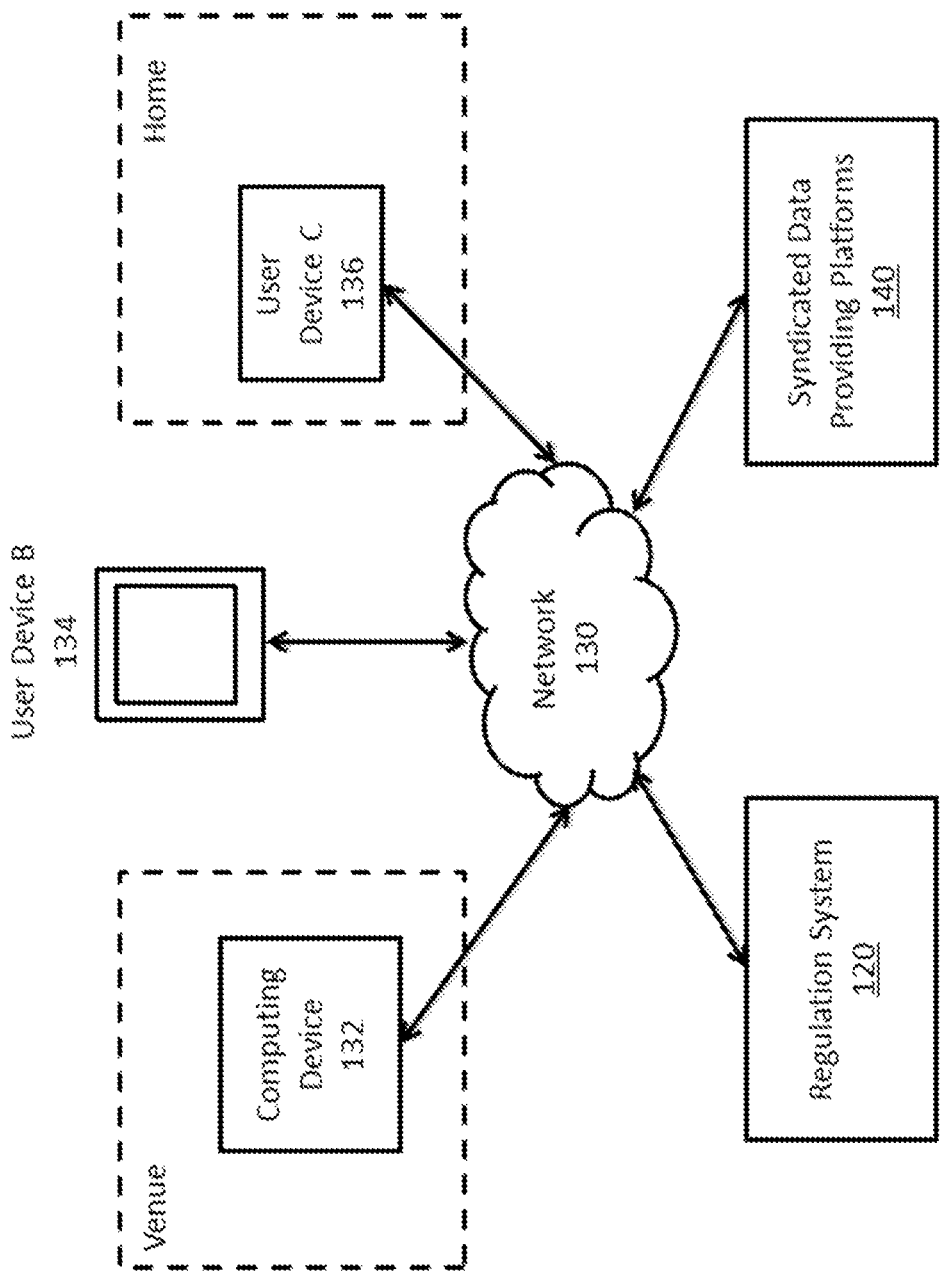
FIG. 1 shows an environment in which the disclosed system may operate, according to some embodiments described herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Methods for Regulating or Limiting Access to Syndicated Data

An aspect of the present disclosure provides a computer-implemented method for regulating access to syndicated data across multiple communication channels, including online and offline channels. A syndicated data item may be issued by an issuer. A syndicated data item may be delivered to a user across multiple communication channels, including online and offline channels. A syndicated data item may be activated upon performance or completion of a user activity (e.g., online user activity, offline user activity, etc.). A syndicated data item may have one or more expiration conditions, wherein after expiration, the syndicated data item becomes unavailable for activation. For example, in some instances, a syndicated data item may expire upon a first instance of the user activity. In some instances, a syndicated data item may expire upon a finite number of instances of the user activity. In some instances, a syndicated data item may expire upon activation by the first user. In some instances, a syndicated data item may expire upon activation by a finite number of users. In yet some other instances, a syndicated data item may expire upon a combination of two or more expiration conditions described above. The issuer of a syndicated data item may define the expiration condition(s) of the syndicated data item. Upon successful activation of a syndicated data item, a user may receive a real benefit associated with the syndicated data item, such as an educational benefit which awards educational credit, monetary benefit which awards financial credit, reputational benefit which awards reputation, opportunistic benefit which awards opportunities, informational benefit which awards information, and the like to the user. Receipt of the real benefit by the user may be referred to herein generally as "redemption."

Beneficially, systems and methods of the present disclosure may track and regulate the availability of activation of the expire-able syndicated data item (having an expiration condition) across multiple communication channels, including online and offline channels, to prevent digital channel conflicts and undesirable syndicated data item stacking. For instance, a user may attempt to combine and activate various syndicated data items via a single user activity in a way that was not intended by the issuer of the syndicated data item. In some instances, syndicated data may comprise data related to or otherwise associated with digital promotions or offers.

In some embodiments, regulating access to such syndicated data may involve limiting activation and redemption of syndicated data items across multiple channels to ensure that no syndicated data item may be redeemed more than once (or any number of limited times) by the same user. In some embodiments, determining the appropriateness of a request to access syndicated data may involve processing requests sent simultaneously or substantially simultaneously. The method may include providing a computer server comprising an electronic data repository having one or more users. A user among the one or more users may be associated with a set of unique identifiers. The set of unique identifiers for the user may be different from a set of unique identifiers for other users in the data repository.

Unique identifiers of the set of unique identifiers may be distinct from one another. A set of unique identifiers may include one or more unique identifiers. The set of unique identifiers may include a plurality of identifiers, which may be individually or in combination different from identifiers of another set of unique identifiers. The plurality of identifiers may be different types of identifiers (e.g., email or device identification), or the same type of identifier (e.g., an email address or different email addresses).

Next, an activation request from a given participating computer platform may be received at the computer server. The activation request may be associated with the set of unique identifiers associated with the user. The activation request may be associated with a syndicated data item from a given issuer. The syndicated data item may be usable by the user at the given participating computer platform among a plurality of participating computer platforms. The syndicated data item may be associated with a set of unique identifiers associated with the syndicated data item. In some instances, participating computer platforms may be a Point of Sale (POS) system.

Next, based on comparing the set of unique identifiers, syndicated data, and activation data, a determination may be made as to whether the syndicated data item is usable by the user at the given participating computer platform. The determination may be based at least in part on whether the syndicated data item has been used at the given participating computer platform by the user or at another participating computer platform among the plurality of participating computer platforms by the user.

Next, an indication as to whether the syndicated data item is usable by the user at the given participating computer platform may be outputted. In some cases, the indication is outputted on a user interface, such as a graphical user interface. The graphical user interface may be provided on an electronic display of the given participating computer platform. As an alternative or in addition to, the graphical user interface may be provided on an electronic display of a mobile electronic device of the user.

In some situations, the participating computer platform is notified with another indication as to whether or not the syndicated data item is usable by the user at the given participating computer platform. The electronic data repository may be updated as to whether or not the syndicated data item is usable by the user at the given participating computer platform. The electronic data repository may comprise data regarding users, syndicated data items, activation log, and the like.

In some situations, the participating computer platform communicates to the electronic data repository with additional syndicated data items and policies for the syndicated data item. The electronic data repository may be updated as to whether or not a syndicated data item by the participating computer platform is modified.

In some situations, the issuer communicates to the electronic data repository with additional syndicated data items and their policies. The electronic data repository may be updated as to whether or not a syndicated data item by the participating computer platform is modified.

In some situations, the electronic data repository may be updated as to whether or not the syndicated data item is activated by the user at the given participating computer platform at a given time.

As used herein, a "syndicated data item" may generally refer to one or more types of documents/items or an expression or representation in one form or another, any of which can be redeemed for a real benefit to the user. Syndicated data items may be presented on one or more computer devices. For example, syndicated data items may be presented on a mobile device or on a mobile application resident on a mobile device of a user.

As used herein, a "participating platform" or "participating computer platform" may generally refer to a platform, system, or venue used to reach users. Participating computer platforms may include systems or devices associated with any entity (e.g., retailers, merchants, third party vendor partners, etc.). The systems or devices which may include kiosks, computer devices, mobile applications or websites. Participating platforms may operate computers or terminals that process activation requests. Participating platforms may also receive or obtain notifications on activities on other participating platforms, via the systems and methods described herein. The notifications may include, for example, notifications on activation requests by users on other participating platforms. Participating platforms may be one or more types of computer systems described herein. For example, participating platforms may be a mobile device or a point of sale (POS) system. Syndicated data items and participating platforms are also described in U.S. application Ser. No. 15/592,062, which application is entirely incorporated herein by reference.

Regulation System

FIG. 1 shows an environment in which the disclosed system may operate, according to some embodiments described herein.

The regulation system 120 may be configured to manage and regulate access to syndicated data. The regulation system 120 may also be configured to manage and regulate the activation and/or redemption of syndicated data items across multiple channels or computing platforms. The regulation system 120 may comprise servers and database systems, which may interact with a plurality of users, devices, or platforms. For example, computing device 132, user device B 134, user device C 136, or syndicated data providing platforms 140 may communicate with a regulation system 120. A user (e.g., users in control of user device B 134 or C 136) can be an individual or entity that is capable of engaging with the regulation system 120 or other connected systems or devices. The regulation system 120 may be in communication—via the network 130—with the various computer devices, user devices, and platforms to obtain relevant data on users and syndicated data items in order to manage and regulate syndicated data item activations and/or redemptions.

User devices such as a user device B 134, user device C 136, and computing devices (e.g., computing device 132), may be any devices associated with one or more users, such as a cellular telephone, a personal digital assistant (PDAs), a tablet, a desktop or a laptop computer, a wearable device, or any other devices including computing functionality and data communication capabilities. The user devices may be configured to enable the user to receive, activate, and/or redeem syndicated data items. The user devices 134, 136 may interact with the regulation system 120 by requesting various data or information related to users, syndicated data items, and activations/redemption via the network 130.

In some embodiments, user devices may be located at different locations. For example, user device B 134 may be located at a store or an area where a user may redeem or activate a syndicated data item. User device C 136 may be located or positioned within a user's home, and the user may use the user device C 136 to redeem a syndicated data item. Alternatively or additionally, a computing device 132 may be located at a venue, which may be a retailer or a store, wherein a user may redeem one's syndicated data item by interacting or communicating with the computing device 132 in one way or another. For example, a user may use the user's mobile device to connect or interact with the computing device 132 via Wi-Fi or Bluetooth or other peer-to-peer networking methods. While only one computing device 132 is shown in FIG. 1, the computing device may represent a plurality of computing devices.

The network 130 may be configured to provide communication between various components of the network layout depicted in FIG. 1. The network 130 may comprise one or more networks that connect devices and/or components in the network layout to allow communication between the devices and/or components. For example, the network may be implemented as the Internet, a wireless network, a wired network, a local area network (LAN), a Wide Area Network (WANs), Bluetooth, Near Field Communication (NFC), or any other type of network that provides communications between one or more components of the network layout. In some embodiments, the network 130 may be implemented using cell and/or pager networks, satellite, licensed radio, or a combination of licensed and unlicensed radio. The network may be wireless, wired (e.g., Ethernet), or a combination thereof. Additionally, while the network 130 is shown in FIG. 1 as a "central" point for communications between the various components (e.g., regulation system 120, syndicated data providing platforms 140, computing device 132, user device B 134, user device C 136) of the network layout, the disclosed embodiments are not limited thereto. For example, one or more components of the network layout may be interconnected in a variety of ways, and may in some embodiments be directly connected to, co-located with, or remote from one another, as one of ordinary skill will appreciate.

Syndicated data providing platforms 140 may be associated with one or more issuers. The syndicated data providing platforms 140 may comprise servers and database systems, and may interact with the regulation system 120 via the network 130 in order to regulate and manage syndicated data items and their activation/redemption activities.

Figure 2:
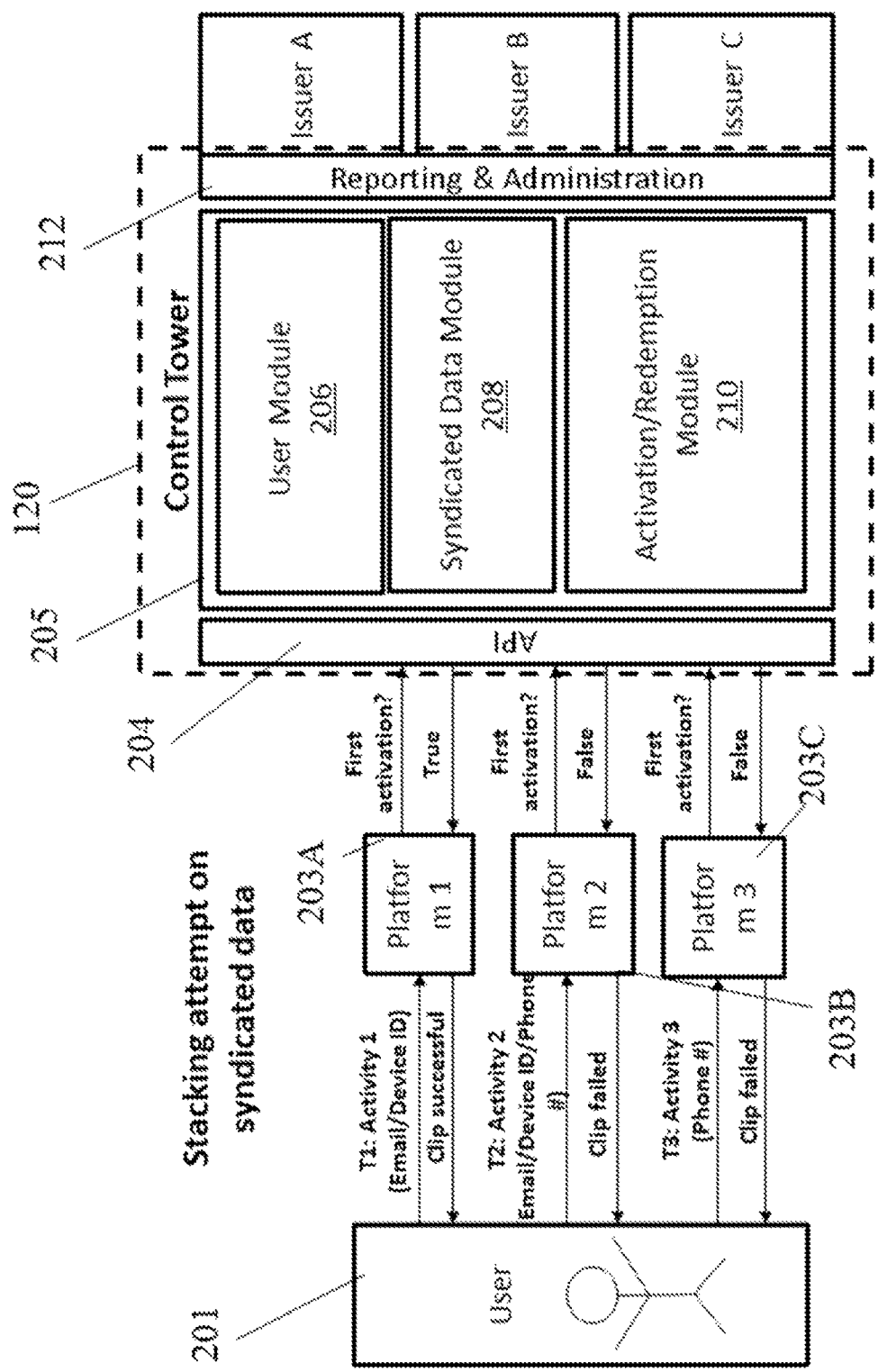
FIG. 2 shows an illustration of an environment and systems for detecting and regulating cross-channel stacking attempts on a syndicated data, according to some embodiments.

In an example, FIG. 2 illustrates an example environment and related systems for regulating activation of syndicated data items, according to some embodiments. FIG. 2 shows a mobile electronic device of the user 201, multiple different participating platforms 203A-C, and the participating platforms in communication with a regulation system 120. The participating platforms may interact with the regulation system 120, for example, via the application programming interface (API) 204 provided for by the regulation system 120. In some embodiments, the regulation system may comprise an API 204, the control tower 205, and the reporting & administration interface 212. The control tower 205 may comprise a user module 206, a syndicated data module 208, and an activation/redemption module 210.

The control tower 205 may be configured to manage or regulate access to syndicated data or regulate or manage their redemption across multiple different channels or participating computer platforms. In an example, the control tower 205 may receive data with regards to the maximum number of requests that a user or a group of users may transmit to the control tower 205. In another example, the control tower 205 may receive data with regards to the maximum number of redeemable syndicated data items across multiple different channels by a single user. Alternatively or additionally, the control tower 205 may receive data with regards to the maximum number of redeemable syndicated data items across multiple different channels across all users. The maximum number of redeemable syndicated data items by a single user or across all users may be configured by the regulation system 120. The issuers interested in providing syndicated data items to users, may communicate such data (e.g., maximum number of redeemable or allowable syndicated data items across all users or by any single user) through the provided API 204 or the reporting and administration interface 212. In some examples, the control tower 205 dynamically allocates or prioritizes the distribution of the set number of syndicated data items across multiple different channels, based at least on the parameters and/or settings that are provided by the issuers. Issuers A, B, C may be part of the syndicated data providing platforms 140.

The control tower 205 may also be configured to receive data with regards to the target user activity (e.g., target spending limit) for the syndicated data items across multiple different channels. The issuers may communicate such data through the provided API 204 or the reporting and administration interface 212. The control tower 205 may dynamically allocate and/or prioritize the distribution of syndicated data items across multiple different channels based at least on the target user activity set by, for example, the issuers. One or more algorithms may be employed to dynamically allocate the syndicated data items. Other conditions or limits regarding the distribution and redemption of syndicated data items may be set by the issuers.

The control tower 205 can also be configured to determine the proper API response. In an example, if the allowed clip is 100 for a certain syndicated data item, once 100 users have attempted to activate such syndicated data item, the control tower can be configured to invalidate any further attempts to activate such syndicated data item. In another example, each channel has different number of allowable clips or activation requests. Such attempt to invalidate may be implemented only if all 100 users have successfully activated such syndicated data item. The allowed number of clips may be configurable by the system disclosed herein.

The user module 206 may be configured to store and manage data, and metadata related to a user. User data may include one or more information provided by the user when the user account is created, for example. The user module may also store one or more unique user identifiers, wherein the unique identifiers for a user may include an email address (or any other contact information) and/or a device identification (ID), such as a media access control (MAC) address or mobile Identifiers for Advertising (IDFA), or any other information or data useful for distinguishing one user from the other, or distinguishing one user device from another. Such information or data may be stored in a centralized repository in a hashed version.

The user module 206 may comprise or interact with a user database, operable to store information or data passed through the API 204. Such information may include a set of unique identifiers described above. The provided unique identifiers may be in a hashed version. Each user may be associated with a different set of unique identifiers, which is different from another user's set of unique identifiers. The user data may be configured such that no two users have the same set of unique identifiers. Also, the user database may be configured such that each user may only have one set of unique identifiers. Under this configuration, given an email address and the device ID, the control tower can determine the user ID that corresponds to the email and the device ID.

The syndicated data module 208 may be configured to store, manage, and track syndicated data items. In some embodiments, the syndicated data items may comprise data, metadata, or any information related to digital promotions or offers provided by one or more issuers. In other embodiments, the syndicated data module 208 may be configured to store syndicated data identifiers, wherein the syndicated data identifiers may be associated with a syndicated data item on one or more participating platforms. In some embodiments, the syndicated data module may be configured to store configurations or settings as it relates to a syndicated data item, wherein each syndicated data item may be associated with a unique identifier. For example, information associated with configurations or settings as it relates to syndicated data items may include, but not limited to, maximum number of allowable redemptions, limitations on the user activity, the types of channels for the syndicated data items to be distributed across, and the like. The maximum number of allowable redemptions may indicate the number redeemable by a single user or may alternatively indicate the number redeemable across all users. For example, a single user may be limited to 5 redemptions per month, and the total number of allowable redemptions may be limited to 100 a month across all users. The syndicated data module may also be configured to store product related data and information, and may be linked to one or more internal or external product databases.

In some embodiments, the syndicated data module 208 may comprise or interact with a syndicated data database, which can be operable to store information passed through the provided API or the reporting and administration interface 212. Different issuers can communicate or interact with the control tower 205 to modify the syndicated data item data, which can be configured to store information related to syndicated data item policies for each issuer. For example, if an issuer (i.e., "Brand A") determines to allow 100 clips of a specific syndicated data item, the syndicated data database can store such data and related metadata. The stored data may include, but not limited to syndicated data item ID, issuer name, allowed number of clips (or redemptions).

The activation/redemption module 210 may be configured to store and track data, metadata, and information related to the redemption and/or activation of syndicated data items. The activation/redemption module 210 may comprise or interact with an activation database, which can be operable to store information related to each activation or redemption event. For each activation event, the activation database can keep track of information including, but not limited to, the time of activation, the location of activation, the user requesting the activation, the syndicated data item ID, the participating platform, other channels the syndicated data item is distributed, and the like.

The system (e.g., digital redemption system or the control tower) in FIG. 2 may be configured on the principle of "first in" attribution, which means that multiple platforms may present a given syndicated data item to the user 201 at the same time or substantially the same time, but the first platform on which activation occurs for that user 201 is given exclusive permission to fulfill the syndicated data item. This configuration may benefit an issuer since the issuer can have control and clear visibility over the distribution and redemption of syndicated data items across multiple different channels and various different user devices. Without a real-time, automated system and method as described herein, issuers may not be able to keep track of redemption activities of a large number of users, especially as the number of users increase exponentially.

In an example, the user 201 attempts to activate a syndicated data item at three distinct, consecutive time periods (T1, T2, T3). At T1, the user 201 may attempt to clip the syndicated data item to a card (which may also be referred to as a "Load to Card" operation) at one participating platform 203A. In some examples, multiple participating platforms may provide syndicated data items to clip to a card. The card may be in a physical form or a digital form, and may or may not be issuer specific. In an example, this operation involves transmission of a set of unique identifiers for the user 201, which may include an email address and device identification (ID), such as a media access control (MAC) address or mobile Identifiers for Advertising (IDFA), or any other data that can aid in distinguishing one user from the other. The participating platforms (e.g., 203A-203C) may use the API 204 (i.e., make API calls) provided by the control tower, for example, to transmit the set of unique identifiers to the control tower 205 (or the regulation system 120). The set of unique identifiers are associated with the user and/or his or her mobile device 201. In an example, the "Load to Card" at time T1 presented at the first platform 203A is the first time the user 201 may be activating a syndicated data item, and the control tower 205 can be configured to communicate, to the participating platform 203A, the validity of the activation request. At T2 (i.e. a later time than T1), the same user 201 can attempt to activate the same syndicated data item through one or more of mobile rebate apps, which may be another participating platform 203B. This participating platform 203B may be distinct from platform 203A. In some examples, multiple different participating platforms may provide syndicated data items through mobile rebate apps or other digital services. The mobile rebate apps platform 203B may use the API 204 to transmit the set of unique identifiers to the control tower 205. The set of unique identifiers may be associated with the same user at T1. Since the user 201 activated the syndicated data item at time T1 at the previous platform 203A, the control tower 205 can communicate to the participating platform the invalidity of the activation request. At T3 (i.e. a later time than T2), the same user 201 may attempt to print or clip a syndicated data item at home and redeem it at another participating platform 203C. In some examples, multiple different participating platforms may provide syndicated data items with an option to print at home. At T3, the participating platform 203C may use the API 204 to transmit a set of unique identifiers associated with a user to the control tower. The set of unique identifiers are associated with the same user at T1. The set of unique identifiers may include a phone number, or any other information associated with the user to uniquely identify the user among a plurality of users. In an example, the user 201 is attempting to activate the syndicated data item at a third participating platform 203C that provides an online print at home option, and since the user has already activated the syndicated data item at T1, the control tower 205 communicates to the third participating platform 203C the invalidity of the activation request. Additionally, the participating platforms 203A-C may be responsible for delivering notifications and informing their users 201 when syndicated data items cannot be activated. For example, the participating platform can send a message to the user 201 (e.g., "Because you've activated this on another platform, it cannot be activated a second time"), which may indicate to the user in one way or another that he or she may not activate the syndicated data item at the specific platform. The message may be in a form of a push notification to the user on his or her respective mobile application, or may be in a form of an e-mail, for example.

In another example, all the participating platforms 203A-C are informed of the activation request of the user at T1. The user 201 at T1 may successfully activate the syndicated data item at platform 203A, and all remaining platforms can receive notification of the activation confirmation by the particular user 201. For example, the platform offering mobile rebate apps 203B and the platform that provides online print at home 203C can receive notification, in real-time or near real-time, that the unique user 201 already activated his or her syndicated data item. Issuers may benefit from the described system and methods since the issuers can regulate and manage redemption of syndicated data items across multiple different platforms, in real-time.

In an example, the control tower 205 may interact with one or more external systems. For example, the control tower may interact with external systems via the API 204 and the reporting and administration interface 212. The control tower 205 can be configured to receive data through the API 204 and the reporting and administration interface 212. In some embodiments, the participating platforms 203A-C can interact with the control tower by making API calls. The API calls may require the platforms to provide various different unique identifiers for each of the user 201. For example, one type of participating platform may require the user to pass through the email and device ID of the user, while a different type of participating platform may require the user to pass through the phone number to make the API call. The reporting and administration layer 212 can be configured to provide issuers access to information stored at the control tower 205.

The regulation system 120 may be configured to provide a dashboard that allows issuers to monitor, in real time or pseudo real-time, the different clip volumes and prices, for example, across multiple different channels or platforms. The dashboard may comprise a graphical user interface. The graphical user interface may display one or more information stored and/or collected by the system, which may include one or more user data, syndicated data item data, or activation data. The monitoring may be accomplished through the reporting and administration interface 212.

Figure 3:
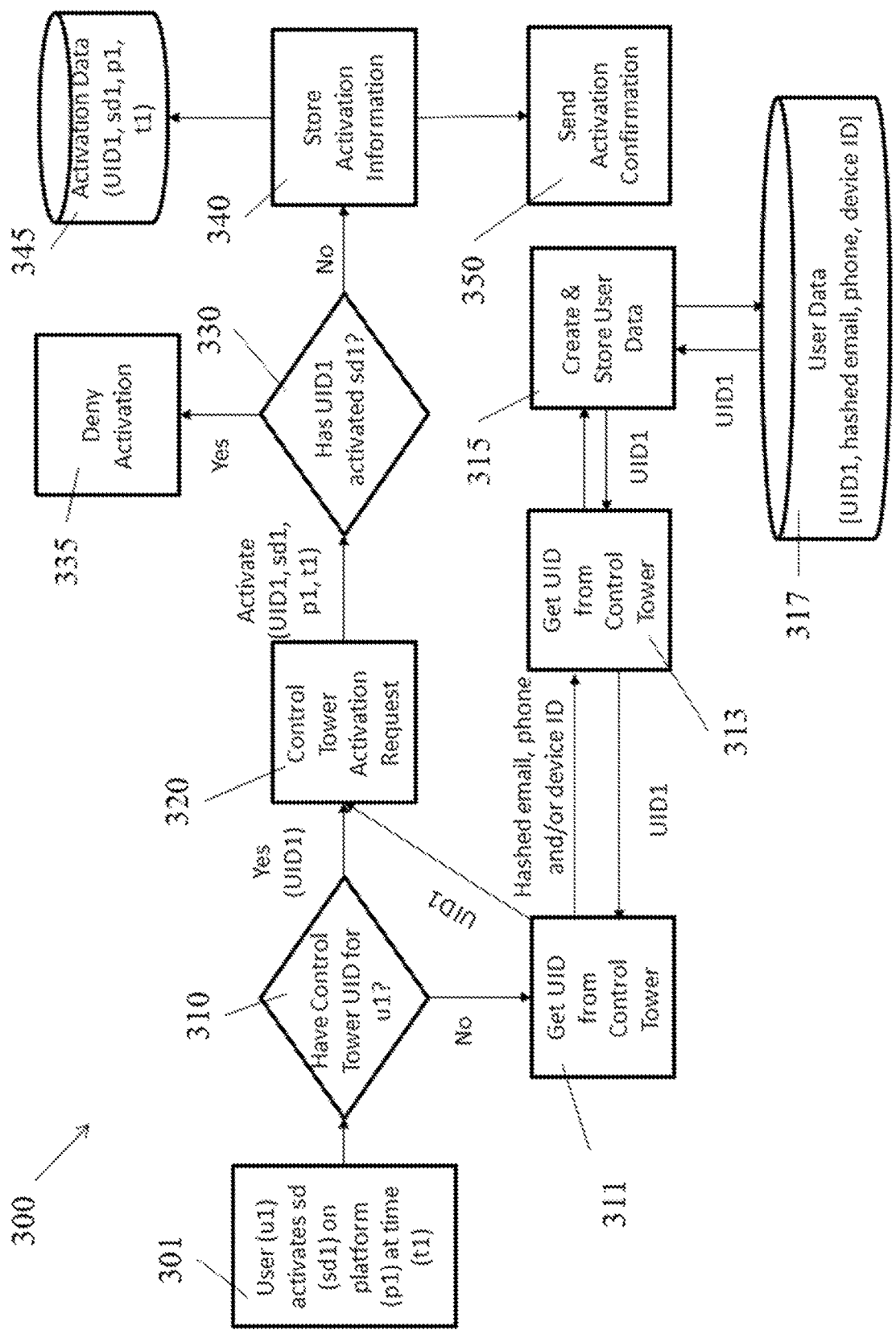
FIG. 3 shows a flow chart illustrating a method for confirming activations, according to some embodiments.

In another example, FIG. 3 shows a flow chart 300 illustrating an example that outlines a method for regulating access to syndicated data (e.g., confirming activations), according to some embodiments. This flow chart 300 is to provide an example of the operation of certain embodiments, and other embodiments may perform some, all, or none of these operation. Some embodiments also perform additional operations.

At operation 301, a user (u1) may attempt to activate a syndicated data item (sd1) on a platform (p1) at time (t1). At operation 310, a determination can be made as to whether the control tower 105 is already storing the user ID that corresponds to the user (u1). If the control tower 105 does not have such information, the process may continue to operation 311 in order to create a new user ID for user (u1). If the control tower 105 already stores such information (i.e., user ID), the next operation 320 may be triggered.

At operation 311, the control tower can be configured to create and store a user ID (UID) for the user (u1). A set of unique identifiers, which includes, but not limited to hashed email, phone number, device ID, may be transmitted as input for the next operation 315. At operation 315, the user data may be created and stored in the user database 317. Operation 311 may return the user ID (UID1) that corresponds to the user (u1). The user ID may correspond to the ID that was created when the user initially signed up, for example.

At operation 320, the control tower 205 activation request may be transmitted for a determination as to whether or not the UID1 (i.e., the user associated with the UID1) has activated the syndicated data item (sd1) before the activation request has been sent (t1). For example, if the user (u1) successfully activated the same syndicated data item (sd1) through a different platform (p2), then the activation request operation of 320 may return negative. In order to determine whether or not the UID1 activated the syndicated data item (sd1), certain information may be provided, including the UID1, syndicated data item information (o1), platform information (p1), and timing of activation. Operation 330 may determine whether or not the activation is valid and deny the activation. If this is the first activation event, the process may continue to process 340.

At operation 340, the activation information can be stored in the activation database 345, which includes a set of information that includes, but not limited to the UID, syndicated data item information, platform information, and timing information. The platform (p1) or the user (u1) may receive the activation confirmation information.

In some examples, each syndicated data item may be redeemable or activated up to a certain number of times by one or more users. The number of times each syndicated data item may be redeemable may be dynamically updated based on when and how syndicated data items have been redeemed or activated. Issuers may, for example, provide a target volume of sales to be generated via activation of certain syndicated data items. The systems and methods provided herein may be configured to dynamically allocate the syndicated data items across multiple different channels to maximize the provided goal or objective.

Figure 4:
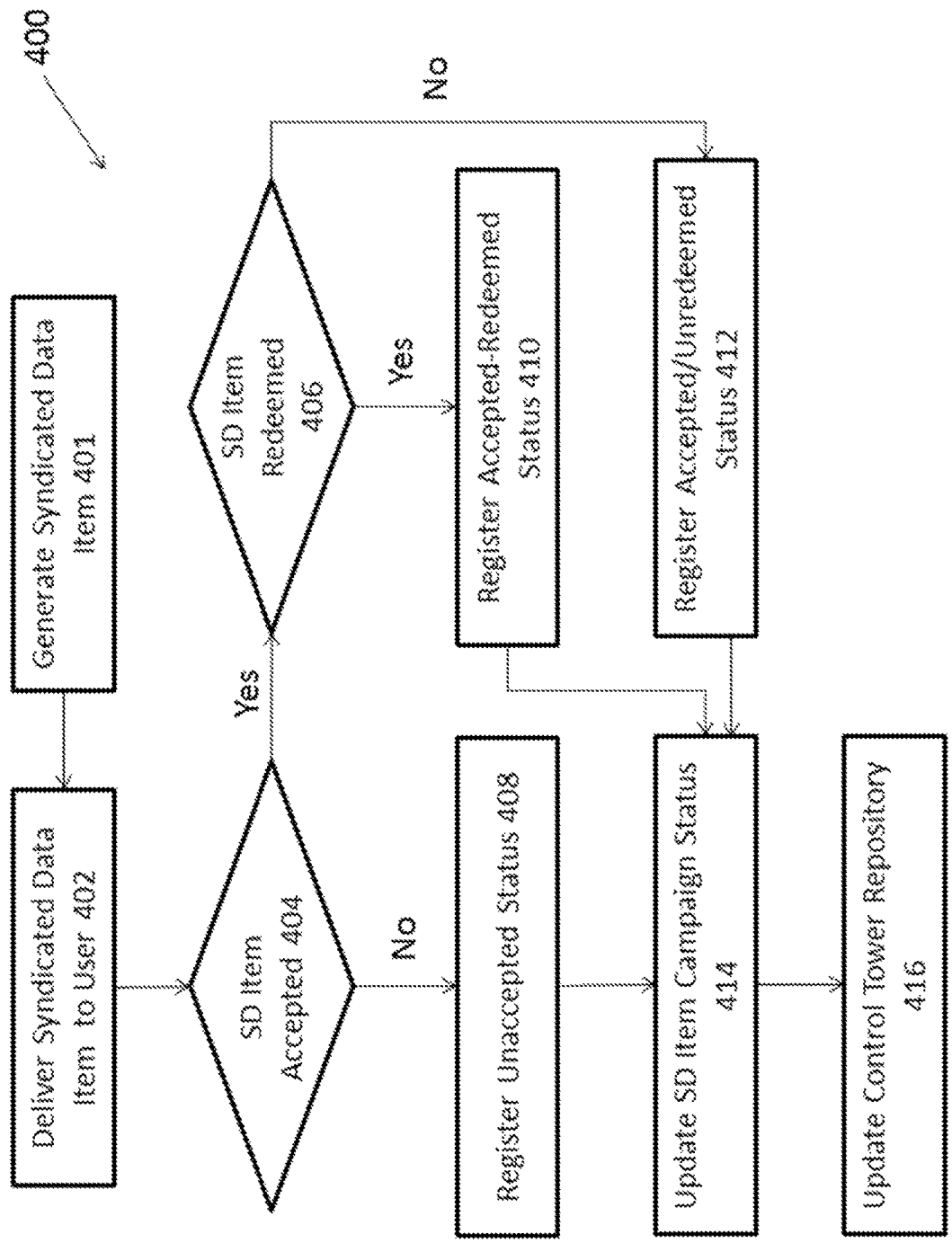
FIG. 4 shows a flow chart of an example method of activation and redemption.

FIG. 4 shows a flow chart of an example method 400 of syndicated data item activation and redemption. Once a user or consumer is qualified to receive a syndicated data item, the regulation system 120 may generate a proposed syndicated data item for the at least one user (operation 401), and deliver the syndicated data item to one or more users (operation 402) via the API 202 to the corresponding user system 201. If the targeted user does not accept the proposed syndicated data item (operation 404), the regulation system 120 may register the unaccepted status (operation 408) and update the syndicated data item campaign status (operation 414). Alternatively, if the targeted user accepts the proposed syndicated data item (operation 404), the regulation system 120 may determine whether the proposed syndicated data item has been redeemed by the user (operation 406), for example, by detecting whether the user has performed according to the terms of the syndicated data item. If so, the regulation system 120 may register the proposed syndicated data item as accepted and redeemed (operation 410) and update the syndicated data item campaign status accordingly (operation 414). Otherwise, the regulation system 120 may register the proposed syndicated data item as accepted but unredeemed (operation 412) and update the syndicated data item campaign status similarly (414). The repositories and relevant data structures of the control tower 105 may also be updated accordingly (operation 416).

Figure 5:
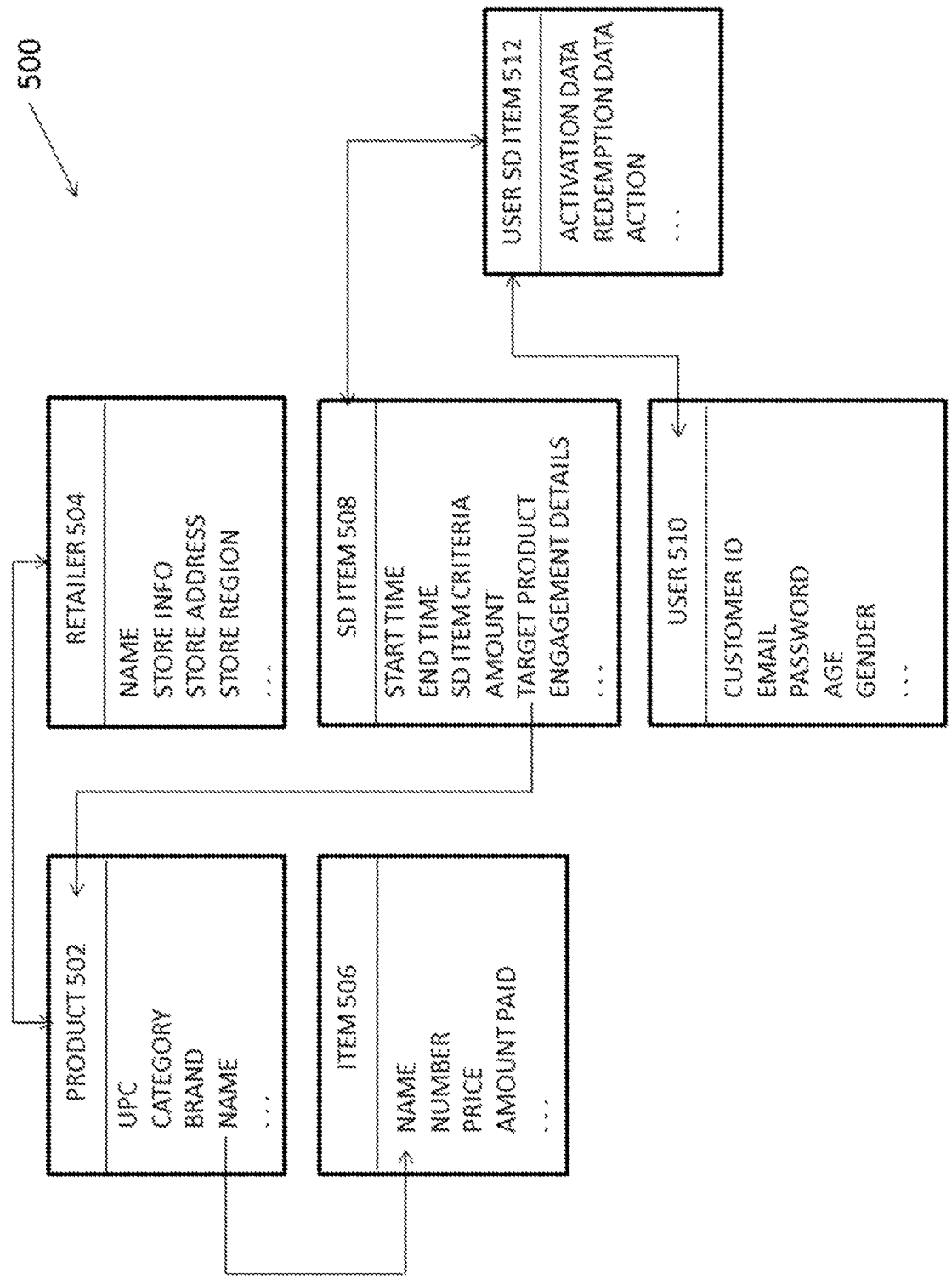
FIG. 5 shows a graphical representation of example data structures employable in the systems of FIG. 1, FIG. 2, FIG. 3, and FIG. 4, according to some embodiments.

FIG. 5 shows a graphical representation of example data structures employable in the systems of FIG. 1, FIG. 2, FIG. 3, and FIG. 4. One or more data structures are associated with each entity or item of interest of the regulation system 120. The data structures 500 may include a product data structure 502 for each product associated with one or more syndicated data item (e.g., offers), a retailer data structure 504 for each issuer (e.g., retailer or merchant) registered with the regulation system 120, an item data structure 506 identifying each purchased item or transaction of one or more users, a syndicated data item data structure 508 (e.g., offer data structure) for each syndicated data item present in the system, including all the syndicated data items stored in the syndicated data module 208, a user data structure for each user registered with the regulation system 120 (e.g., data associated or stored and managed by the user module 206), and a user syndicated data item data structure 512 for each syndicated data item targeted for a user.

Each of the data structures 500 may include data fields carrying specific types of data associated with the encompassing data structure 500. For example, the product data structure 502 includes data fields for at least a UPC for the product, a product category, a product brand, and a product name. User syndicated data item data structure 512 may also include data fields for at least the activation data, the redemption data, and the action associated with the engagement details linked to the syndicated data item data structure 508, as illustrated in FIG. 5. While specific data structure types and data fields are indicated in FIG. 5, other schemes for the data structures 500 and included fields are possible in other implementations.

Also depicted in FIG. 5 are links, pointers, or similar structures (as illustrated by the directional arrows provided therein) indicating how the various data structures 500 may be associated with each other. For example, a particular user syndicated data item data structure 512, to identify to identify a user and the targeted syndicated data item for the user, may link or point to the specific user data structure 510 and the syndicated data item data structure 508, respectively. Examples of other links or pointers connecting data structures or data fields therein are presented in FIG. 5. While FIG. 5 generally depicts a relational data structure, a person of ordinary skill in the art will understand that other types of data structures (e.g., NoSQL, data stores, such as document store, column-oriented store, key value store, and others) may be used in this and other embodiments in place of, or in combination with, the data structures 500 of FIG. 5. Such data structures may appear with various data store types (e.g., data warehouse, distributed data store, activate data store, unstructured data store, and so on).

Computer Control Systems

Figure 6:
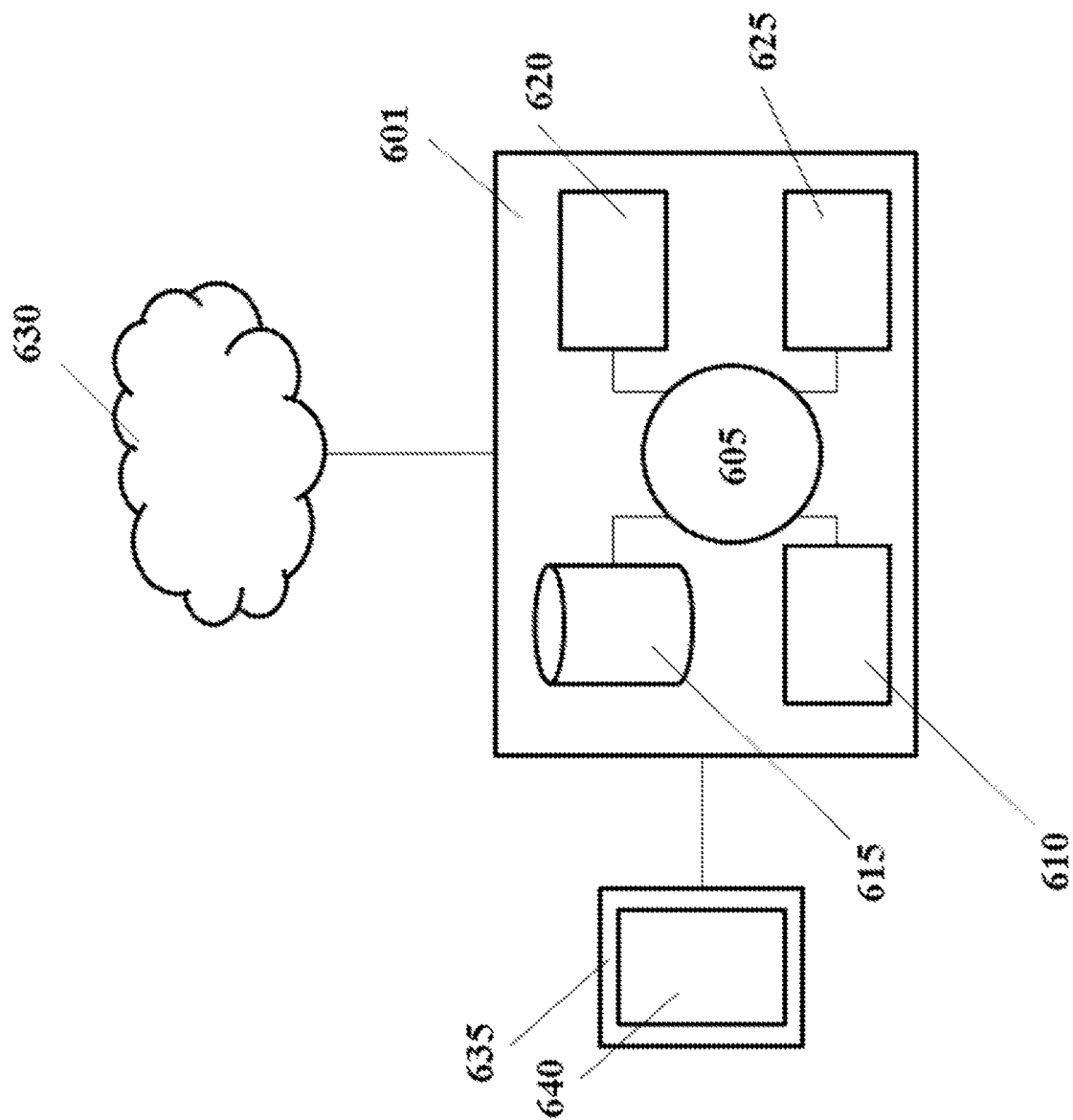
FIG. 6 shows a computer control system that is programmed or otherwise configured to implement methods provided herein.

The present disclosure provides computer control systems that are programmed to implement methods of the disclosure. FIG. 6 shows a computer system 501 that is programmed or otherwise configured to regulate the activation and redemption of syndicated data items. The computer system 501 can regulate various aspects of FIGS. 1-5 of the present disclosure, such as, for example, the API 204, the control tower 205, one or more operations of the flow chart illustrated in FIGS. 3 and 4.

The computer system 601 includes a central processing unit (CPU, also "processor" and "computer processor" herein) 605, which can be a single core or multi core processor, or a plurality of processors for parallel processing. The computer system 601 also includes memory or memory location 610 (e.g., random-access memory, read-only memory, flash memory), electronic storage unit 615 (e.g., hard disk), communication interface 620 (e.g., network adapter) for communicating with one or more other systems, and peripheral devices 625, such as cache, other memory, data storage and/or electronic display adapters. The memory 610, storage unit 615, interface 620 and peripheral devices 625 are in communication with the CPU 605 through a communication bus (solid lines), such as a motherboard. The storage unit 615 can be a data storage unit (or data repository) for storing data. The computer system 601 can be operatively coupled to a computer network ("network") 630 with the aid of the communication interface 620. The network 630 can be the Internet, an internet and/or extranet, or an intranet and/or extranet that is in communication with the Internet. The network 630 in some cases is a telecommunication and/or data network. The network 630 can include one or more computer servers, which can enable distributed computing, such as cloud computing. The network 630, in some cases with the aid of the computer system 601, can implement a peer-to-peer network, which may enable devices coupled to the computer system 601 to behave as a client or a server.

The CPU 605 can execute a sequence of machine-readable instructions, which can be embodied in a program or software. The instructions may be stored in a memory location, such as the memory 610. The instructions can be directed to the CPU 605, which can subsequently program or otherwise configure the CPU 605 to implement methods of the present disclosure. Examples of operations performed by the CPU 605 can include fetch, decode, execute, and writeback.

The CPU 605 can be part of a circuit, such as an integrated circuit. One or more other components of the system 601 can be included in the circuit. In some cases, the circuit is an application specific integrated circuit (ASIC).

The storage unit 615 can store files, such as drivers, libraries and saved programs. The storage unit 615 can store user data, e.g., user preferences and user programs. The computer system 601 in some cases can include one or more additional data storage units that are external to the computer system 601, such as located on a remote server that is in communication with the computer system 601 through an intranet or the Internet.

The computer system 601 can communicate with one or more remote computer systems through the network 630. For instance, the computer system 601 can communicate with a remote computer system of a user or a participating platform (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 601 via the network 630.

Methods as described herein can be implemented by way of machine (e.g., computer processor) executable code stored on an electronic storage location of the computer system 601, such as, for example, on the memory 610 or electronic storage unit 615. The machine executable or machine readable code can be provided in the form of software. During use, the code can be executed by the processor 605. In some cases, the code can be retrieved from the storage unit 615 and stored on the memory 610 for ready access by the processor 605. In some situations, the electronic storage unit 615 can be precluded, and machine-executable instructions are stored on memory 610.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 601, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 601 can include or be in communication with an electronic display 635 that comprises a user interface (UI) 640 for providing, for example, displaying the results of the activation/redemption request or displaying user data, activation/redemption data, or related syndicated data item data. The user interface may also enable issuers to adjust one or more parameters for the provided syndicated data items. For example, the issuers may monitor and adjust their syndicated data item campaign by adjusting the total number of redemption available for any one or more products. The user interface may be configured to provide such functionality. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 605. For example, some embodiments use the algorithm illustrated in FIG. 3 or other algorithms provided in the associated descriptions. Other embodiments may use algorithms similar to those of FIGS. 2 and 4 and its associated descriptions.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for regulating availability of a syndicated data item to a user across a plurality of participating computer platforms, comprising:
   (a) generating (i) a unique user identifier associated with a user across a plurality of participating computer platforms and (ii) a syndicated data identifier associated with a syndicated data item across said plurality of participating computer platforms, wherein said syndicated data item comprises engagement details;
   (b) determining whether said user is qualified for said syndicated data item based at least in part on said engagement details of said syndicated data item and user activities associated with said user, wherein said engagement details comprise a plurality of target user activities, and said user is qualified for said syndicated data item when a user activity associated with said user fulfills one or more of the plurality of said target user activities;
   (c) triggering a delivery of said syndicated data item to said user when said user is qualified for said syndicated data item, wherein said syndicated data item comprises a first configurable number of maximum activation requests limit from said user across said plurality of participating computer platforms;
   (d) receiving from said user on a given participating computer platform among said plurality of participating computer platforms, a request to activate said syndicated data item;
   (e) determining whether said syndicated data item on said given participating computer platform is activatable by said user based at least in part on whether a number of times said syndicated data item has previously been activated by said user and said plurality of participating computer platforms is less than said first configurable number of maximum activation requests limit, wherein, upon satisfaction of said first configurable number of maximum activation requests limit, a regulation system transmits, in real time, an activation-status notification to each remaining participating computer platform registered for the syndicated data item, thereby preventing further activations and resolving digital-channel conflicts;
   (f) storing or updating an activation data associated with said requested syndicated data item when said syndicated data item is activated by said user upon a performance or completion of an activation user activity according to said engagement details; and
   (g) storing or updating a redemption data associated with said requested syndicated data item when said syndicated data item is redeemed by said user.

2. The method of claim 1, herein said syndicated data item further comprises a total activation limit, wherein said total activation limit comprises a second configurable number of maximum activation requests limit across a plurality of users across said plurality of participating computer platforms, and wherein in (e), said determining further comprises determining based at least in part on whether a number of times said syndicated data item has previously been activated by said plurality of users is less than said second configurable number of maximum activation requests limit.

3. The method of claim 1, wherein in (f), said providing further comprises displaying said response of the request on a graphical user interface of said given participating computer platform.

4. The method of claim 1, wherein in (f), said providing further comprises displaying said response of the request on a graphical user interface of a mobile electronic device of said user.

5. The method of claim 4, wherein said graphical user interface is further configured by a mobile application running on said mobile electronic device.

6. The method of claim 1, wherein said syndicated data item further comprises activation request time range limit, activation request location limit, and a type of said participating platform among said plurality of participating computer platforms that the syndicated data is available for activation.

7. The method of claim 1, wherein the plurality of target user activities comprises a target spending amount associated with said user.

8. The method of claim 1, wherein the unique user identifier remains unchanged when said user accesses said syndicated data on different computer platforms among said plurality of participating computer platforms.

9. The method of claim 1, wherein said syndicated data item further comprises (i) a first status indicating whether said syndicated data item has been accepted by a given user after the delivery; (ii) a second status indicating whether said syndicated data item has been activated by a given user.

10. The method of claim 1, further comprising: (i) collecting performance metrics associated with said syndicated data item across said plurality of participating computer platforms; and (ii) providing the collected performance metrics via an interface accessible by an administrator or campaign manager.

11. The method of claim 10, further comprising: (i) analyzing the performance metrics collected to identify usage patterns; and (ii) dynamically adjusting one or more parameters of said syndicated data item based on said analysis, thereby regulating user engagement across said plurality of participating computer platforms.

12. A system for regulating availability of a syndicated data item to a user across a plurality of participating computer platforms, comprising:

one or more computer servers comprising at least one electronic data repository; and one or more computer processors operatively coupled to said one or more computer servers, wherein said one or more computer processors are individually or collectively programmed to:

generate (i) a unique user identifier associated with a user across a plurality of participating computer platforms and (ii) a syndicated data identifier associated with a syndicated data item across said plurality of participating computer platforms, wherein said syndicated data item comprises engagement details;

determine whether said user is qualified for said syndicated data item based at least in part on said engagement details of said syndicated data item and user activities associated with said user, wherein said engagement details comprise a plurality of target user activities, and said user is qualified for said syndicated data item when a user activity associated with said user fulfills one or more of the plurality of said target user activities;

trigger a delivery of said syndicated data item to said user when said user is qualified for said syndicated data item, wherein said syndicated data item comprises a first configurable number of maximum activation requests limit from said user across said plurality of participating computer platforms;

receive, from said user on a given participating computer platform among said plurality of participating computer platforms, a request to activate said syndicated data item;

determine whether said syndicated data item on said given participating computer platform is activatable by said user based at least in part on whether a number of times said syndicated data item has previously been activated by said user at said plurality of participating computer platforms is less than said first configurable number of maximum activation requests limit, wherein, upon satisfaction of said first configurable number of maximum activation requests limit, a regulation system transmits, in real-time, an activation-status notification to each remaining participating computer platform registered for the syndicated data item, thereby preventing further activations and resolving digital-channel conflicts;

store or update an activation data associated with said requested syndicated data item when said syndicated data item is activated by said user upon a performance or completion of an activation user activity according to said engagement details; and store or update a redemption data associated with said requested syndicated data item when said syndicated data item is redeemed by said user.

13. The system of claim 12, wherein said syndicated data item further comprises a total activation limit, wherein said total activation limit comprises a second configurable number of maximum activation requests limit across a plurality of users across said plurality of participating computer platforms, and wherein said determine whether said syndicated data item on said given participating computer platform is activatable by said user further comprises determine based as least in part on whether a number of times said syndicated data item has previously been activated by said plurality of users is less than said second configurable number of maximum activation requests limit.

14. The system of claim 12, wherein said provide a response further comprises display said response of the request on a graphical user interface of said given participating computer platform.

15. The system of claim 12, wherein said provide a response further comprises display said response of the request on a graphical user interface of a mobile electronic device of said user.

16. The system of claim 15, wherein said graphical user interface is further configured by a mobile application running on said mobile electronic device.

17. The system of claim 12, wherein said syndicated data item further comprises activation request time range limit, activation request location limit, and a type of said participating platform among said plurality of participating computer platforms that the syndicated data is available for activation.

18. The system of claim 12, wherein the plurality of target user activities comprise a target spending amount associated with said user.

19. The system of claim 12, wherein the unique user identifier remains unchanged when said user accesses said syndicated data on different computer platforms among said plurality of participating computer platforms.

20. The system of claim 12, wherein said syndicated data item further comprises (i) a first status indicating whether said syndicated data item has been accepted by a given user after the delivery; (ii) a second status indicating whether said syndicated data item has been activated by a given user.

\* \* \* \* \*